United States Patent
Li et al.

(10) Patent No.: US 10,411,619 B2
(45) Date of Patent: Sep. 10, 2019

(54) MOTOR CONTROLLER, DRIVE CIRCUIT, AND METHODS FOR COMBINED ELECTRIC MOTOR CONTROL

(71) Applicant: REGAL BELOIT AMERICA, INC., Beloit, WI (US)

(72) Inventors: Ming Li, Fort Wayne, IN (US); Roger Carlos Becerra, Fort Wayne, IN (US); Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 216 days.

(21) Appl. No.: 14/838,722

(22) Filed: Aug. 28, 2015

(65) Prior Publication Data

US 2017/0063260 A1    Mar. 2, 2017

(51) Int. Cl.
| | |
|---|---|
| *H02P 27/06* | (2006.01) |
| *H02P 5/74* | (2006.01) |
| *H02P 23/26* | (2016.01) |
| *H02P 29/50* | (2016.01) |

(52) U.S. Cl.
CPC .......... *H02P 5/74* (2013.01); *H02P 23/26* (2016.02); *H02P 29/50* (2016.02); *H02P 2201/03* (2013.01)

(58) Field of Classification Search
CPC ...... H02P 27/06; H02P 27/04; H02P 2201/15; H02P 2201/03; H02P 2201/13
See application file for complete search history.

(56) References Cited

U.S. PATENT DOCUMENTS

| | | | |
|---|---|---|---|
| 5,982,136 A | * | 11/1999 | Pelly .............. H02H 1/0007 318/801 |
| 6,075,717 A | | 6/2000 | Kumar et al. |
| 7,586,285 B2 | * | 9/2009 | Gunji .............. B62D 5/0487 318/716 |
| 7,650,760 B2 | | 1/2010 | Nakata et al. |
| 8,508,166 B2 | | 8/2013 | Marcinkiewicz et al. |
| 8,716,964 B2 | | 5/2014 | Tanaka et al. |

(Continued)

FOREIGN PATENT DOCUMENTS

FI            121834 B      4/2011

OTHER PUBLICATIONS

ISR/WO dated Jan. 19, 2017 for PCT/US16/48127 filed Aug. 23, 2016, 12 pages.

*Primary Examiner* — Bickey Dhakal
(74) *Attorney, Agent, or Firm* — Armstrong Teasdale (57) ABSTRACT

An electric motor controller, an electric motor drive circuit, and methods for combined electric motor control are provided. The drive circuit is configured to drive a first electric motor and a second electric motor. The drive circuit includes a rectifier configured to convert an AC input voltage to a pulsed DC voltage, and a first DC link electrically coupled to the rectifier. The first DC-link includes a low-capacitance capacitor having a capacitance less than 10 μF. The drive circuit also includes a first inverter coupled to the first DC-link, the first inverter configured to generate a conditioned output voltage to drive the first electric motor, a second DC-link electrically coupled to the first DC-link, and a second inverter coupled to the second DC-link. The second inverter is configured to generate a conditioned output voltage to drive the second electric motor.

14 Claims, 10 Drawing Sheets

(56) References Cited

U.S. PATENT DOCUMENTS

| | | |
|---|---|---|
| 8,981,686 B2 | 3/2015 | Becerra et al. |
| 9,625,190 B2 * | 4/2017 | Lee .......................... F25B 31/02 |
| 9,762,171 B2 * | 9/2017 | Tateda .................... H02P 27/06 |
| 2004/0245783 A1 * | 12/2004 | Gilbreth .................... H02J 1/10 |
| | | 290/52 |
| 2012/0235617 A1 | 9/2012 | Singh |
| 2014/0054103 A1 * | 2/2014 | Kezobo ................ B62D 5/0487 |
| | | 180/446 |
| 2014/0203755 A1 * | 7/2014 | Becerra .................... H02P 6/10 |
| | | 318/812 |

* cited by examiner

MOTOR CONTROLLER, DRIVE CIRCUIT, AND METHODS FOR COMBINED ELECTRIC MOTOR CONTROL

BACKGROUND OF THE DISCLOSURE

The field of the invention relates generally to electric motors, and more specifically, to a motor controller, a drive circuit, and methods for combined electric motor control.

Motor drive systems used in air-conditioners and heat pumps of heating, ventilation, air-conditioning (HVAC) applications typically utilize an active power factor correction (PFC) AC-DC stage and use large aluminum electrolytic capacitors (e.g., 3000 microfarads), in order to maintain constant DC voltage, increased power factor, reduced harmonics, and longer lifetime of electrolytic capacitors. As a result, such systems have lower power density, lower efficiency and higher cost. Additionally, a large DC-link capacitance leads to high inrush current during the power-up process. A relay or multiple-relays may be used to control the inrush current, which further increases the system size, cost, and the burden of auxiliary lower power supply design. Moreover, in some applications, ground-fault protection must be included in HVAC products, which typically involves multiple sensors and/or expensive common-mode current transformers to detect ground fault currents.

Stand-alone low-capacitance motor drive systems (also referred to as direct power transfer (DPT) technology) have been developed in lower power (i.e., less than or equal to 1 HP) HVAC air-moving applications. This DPT technology uses a film capacitor (i.e., less than 10 uF) as the DC-link energy storage component. The film capacitor significantly reduces the inrush current, eliminates the bulky DC-link electrolytic capacitors and the corresponding reliability concern, and offers the feasibility of packaging the overall motor drive system. However, DPT technology includes certain other design challenges, such as lightning protection concerns and larger voltage regeneration.

BRIEF DESCRIPTION OF THE DISCLOSURE

In one aspect, an electric motor drive circuit configured to drive a first electric motor and a second electric motor is provided. The electric motor drive circuit includes a rectifier configured to convert an AC input voltage to a pulsed DC voltage and a first DC link electrically coupled to the rectifier. The first DC-link includes a low-capacitance capacitor having a capacitance less than 10 μF. The drive circuit also includes a first inverter coupled to the first DC-link, the first inverter configured to generate a conditioned output voltage to drive the first electric motor, a second DC-link electrically coupled to the first DC-link, and a second inverter coupled to the second DC-link. The second inverter is configured to generate a conditioned output voltage to drive the second electric motor.

In another aspect, an electric motor controller configured to control a first electric motor to drive a first load and a second electric motor to drive a second load is provided. The electric motor drive controller includes a first control unit coupled to the first electric motor. The first control unit is configured to increase energy transfer from the first electric motor to the first load when input voltage is available and to mitigate a reduction in energy transfer from the first load to the first electric motor to produce positive torque when a DC link voltage of the first electric motor has approximately 100% voltage ripple. The electric motor drive controller also includes a second control unit configured to generate a control signal for driving the second electric motor.

In yet another aspect, an electric motor system is provided that includes a first electric motor, and an electric motor controller communicatively coupled to the first electric motor. The electric motor drive controller includes a first control unit coupled to the first electric motor and configured to increase energy transfer from the first electric motor to a first load when input voltage is available and to mitigate a reduction in energy transfer from the first load to the first electric motor to produce positive torque when a DC link voltage has approximately 100% voltage ripple, and a second control unit configured to generate a control signal for driving a second electric motor.

In yet another aspect, a control unit configured to be coupled to a first electric motor is provided. The control unit is configured to increase energy transfer from the first electric motor to a first load when input voltage is available and to mitigate a reduction in energy transfer from the first load to the first electric motor to produce positive torque when a DC link voltage is one of approaching zero and equal to zero.

In yet another aspect, a method of controlling a first electric motor to drive a first load and a second electric motor to drive a second load is provided. The method includes increasing, by a motor controller, energy transfer from the first electric motor to the first load when input voltage is available. The method further includes mitigating, by the motor controller, a reduction in energy transfer from the first load to the first electric motor to produce positive torque when a direct current (DC) link voltage is one of approaching zero and equal to zero. The method further includes generating, by the motor controller, a control signal for application to the second electric motor.

DETAILED DESCRIPTION OF THE DISCLOSURE

Figure 1:
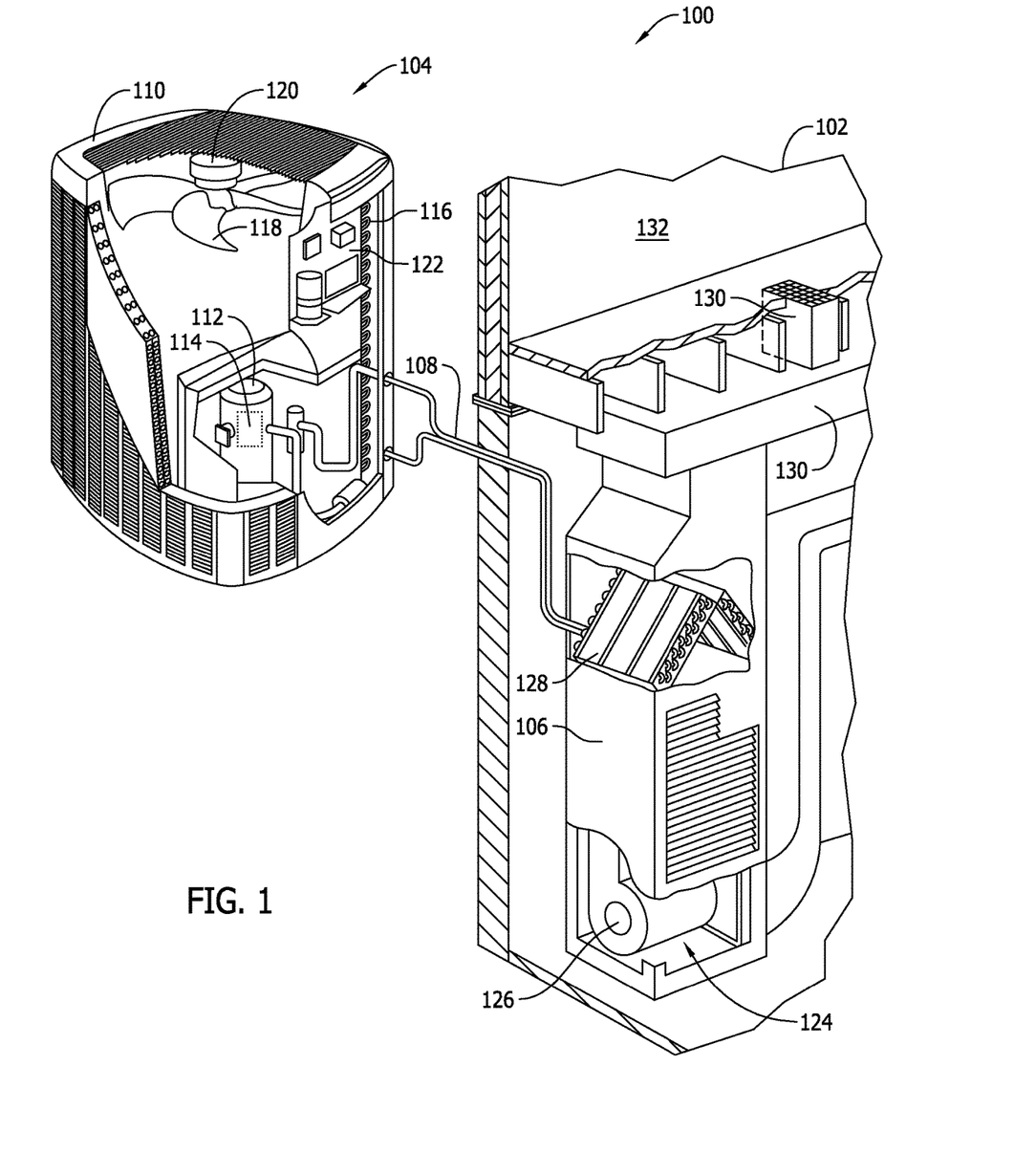
FIG. 1 illustrates an exemplary residential HVAC system configured to provide heated air, cooled air, and/or ventilated air to a structure.

FIG. 1 illustrates an exemplary residential heating, ventilation, and air-conditioning (HVAC) system 100 configured to provide heated air, cooled air, and/or ventilated air to a structure 102, (e.g., a house, a building, a warehouse, etc.). In the exemplary embodiment, HVAC system 100 includes an outdoor unit 104 positioned outside, but adjacent to structure 102, and an indoor unit 106 positioned within structure 102, for example, in a utility room, an attic, or a basement. HVAC system 100 also includes refrigerant conduits 108 configured to transfer refrigerant between outdoor unit 104 and indoor unit 106, typically transferring primarily liquid refrigerant in one direction and primarily vaporized refrigerant in an opposite direction, depending on a mode of operation.

In the exemplary embodiment, outdoor unit 104 includes a housing 110, a compressor 112 having a compressor motor 114, a heat exchange coil 116, a condenser fan 118, a condenser fan motor 120, and motor drive circuit 122. Housing 110 protects components of outdoor unit 104 and prevents leaves and other contaminants from entering outdoor unit 104. When HVAC system 100 is in an air conditioning mode, outdoor unit 104 receives refrigerant channeled from refrigerant conduits 108 into compressor 112 via refrigerant conduits 108. Compressor motor 114 compresses the refrigerant using compressor 112, causing a temperature and pressure of the refrigerant to increase. The hot refrigerant gas is channeled to heat exchange coil 116. Condenser fan motor 120 turns condenser fan 118 to circulate environmental air across heat exchange coil 116, causing the air to increase in temperature and the refrigerant to decrease in temperature. Heat exchange coil 116 serves as a condenser for re-condensing vaporized refrigerant flowing from indoor unit 106 to outdoor unit 104. The heated air is expelled above outdoor unit 104 at a higher temperature than when it entered. The condensed refrigerant in liquid form is then channeled to indoor unit 106 via refrigerant conduits 108.

In one embodiment, motor drive circuit 122 is coupled to housing 110 and is in electrical communication with compressor motor 114 and condenser fan motor 120. In an alternative embodiment, compressor motor 114 incorporates motor drive circuit 122 physically located thereon that is also operable for controlling operation of condenser fan motor 120. In another alternative embodiment, condenser fan motor 120 incorporates motor drive circuit 122 physically located thereon that is also operable for controlling operation of compressor motor 114.

In the exemplary embodiment, indoor unit 106 includes a blower 124 having a blower motor 126, a heat exchange coil 128, and a plurality of vents 130. Upon entering indoor unit 106, the refrigerant is channeled into heat exchange coil 128. Blower motor 126 operates blower 124 to force air across heat exchange coil 128. While in heat exchange coil 128, the liquid refrigerant evaporates by absorbing heat from the forced air, causing the temperature of the air to decrease. The evaporated refrigerant is then channeled back to outdoor unit 104 via refrigerant conduits 108. The cooled air is distributed throughout structure 102 through vents 130.

Alternatively, when HVAC system 100 is in a heating mode, the roles of heat exchangers 116 and 128 are reversed. That is, heat exchanger 116 of outdoor unit 104 serves as an evaporator to evaporate refrigerant as the air passes over it, thereby cooling the air entering outdoor unit 104. Indoor heat exchanger 128 cools and condenses the refrigerant as air is forced across it, thereby heating the air.

In the exemplary embodiment, HVAC system 100 further includes a thermostat 132 communicatively coupled to motor drive circuit 122. Motor drive circuit 122 is configured to control operation of at least one of compressor motor 114, condenser fan motor 120, and/or blower motor 126. In the exemplary embodiment, each of compressor motor 114, condenser fan motor 120, and blower motor 126 are electronically controlled variable speed motors.

Figure 2:
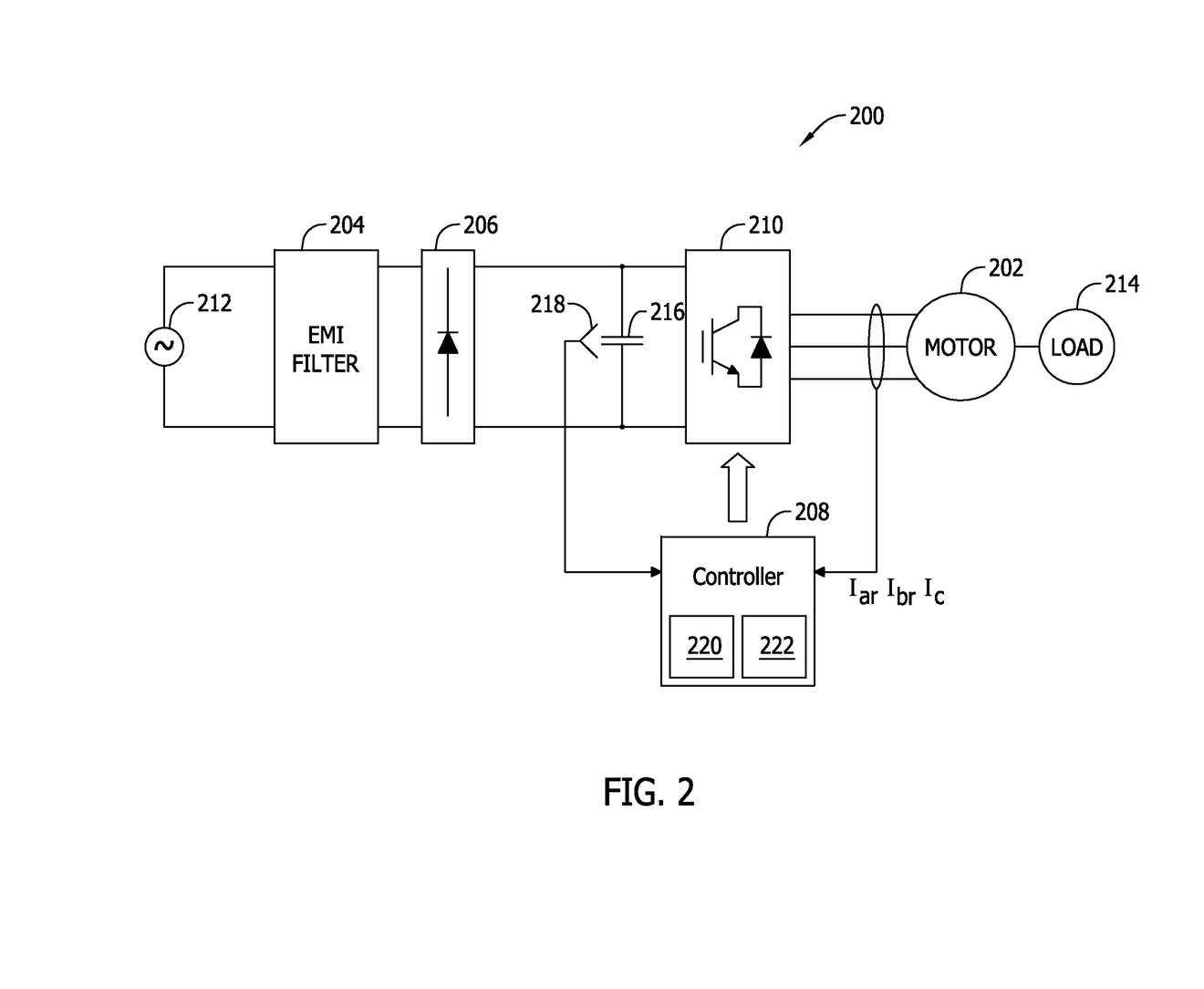
FIG. 2 is a circuit diagram of a motor drive circuit that may be used for operating an electric motor.

FIG. 2 is a circuit diagram of a motor drive circuit 200 that may be used for operating an electric motor 202, such as compressor motor 114, condenser fan motor 120, and/or blower motor 126 (shown in FIG. 1). In the exemplary embodiment, motor drive circuit 202 includes an electromagnetic interference (EMI) filter 204, a rectifier 206, a control unit 208, and an inverter 210. Motor drive circuit 200 is coupled to a power supply 212 for receiving input power to drive electric motor 202. Electric motor 202 is coupled to and drives a load 214.

In the exemplary embodiment, power supply 212 supplies a single-phase AC voltage to motor drive circuit 200. However, power supply 212 may supply three-phase AC, direct current (DC) voltage, or any other type of input voltage that enables motor drive circuit 200 to function as described herein. EMI filter 204 filters any anomalies in regard to incoming AC power. Rectifier 206 receives and rectifies the AC input voltage from a power supply 212 to produce a pulsed DC voltage. Inverter 210 conditions the pulsed DC voltage, and supplies it to electric motor 202, which uses the power to drive load 214. In the exemplary embodiment, inverter 210 converts the pulsed DC voltage to a three-phase AC voltage. Alternatively, inverter 210 converts the pulsed DC voltage to any type of voltage that enables motor drive circuit 200 to function as described herein.

In some embodiments, motor drive circuit 200 includes a low-capacitance capacitor 216 for storing small amounts of energy when input voltage is available. Capacitor 216 may have a capacitance between about 0.1 µF and about 10 µF. The use of bulky, unreliable electrolytic filter capacitors in motor drive circuit 200 is avoided. In some embodiments, capacitor 216 is configured to filter out switching frequency harmonics of electric motor 202. In other embodiments, the low-capacitance of capacitor 216 reduces inrush input current to electric motor 202. Further, capacitor 216 facilitates motor drive circuit 200 increasing line input power factor.

Motor drive circuit 200 also includes a voltage sensor 218 coupled across capacitor 216. Voltage sensor 218 is configured to measure a DC link voltage being output by rectifier 206. Voltage sensor 218 provides the DC link voltage measurement to control unit 208 for use in controlling electric motor 202 to produce torque when DC link voltage has a 100% voltage ripple.

In the exemplary embodiment, motor drive circuit 200 also includes control unit 208 that includes a processor 220 and a memory device 222. In the exemplary embodiment, control unit 208 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, control unit 208 is constructed of software and/or firmware embedded in one or more processing devices. In this manner, control unit 208 is programmable, such that instructions, intervals, thresholds, and/or ranges, etc. may be programmed for a particular electric motor 202 and/or operator of electric motor 202. Control unit 208 may be wholly or partially provided by discrete components, external to one or more processing devices.

Figure 3:
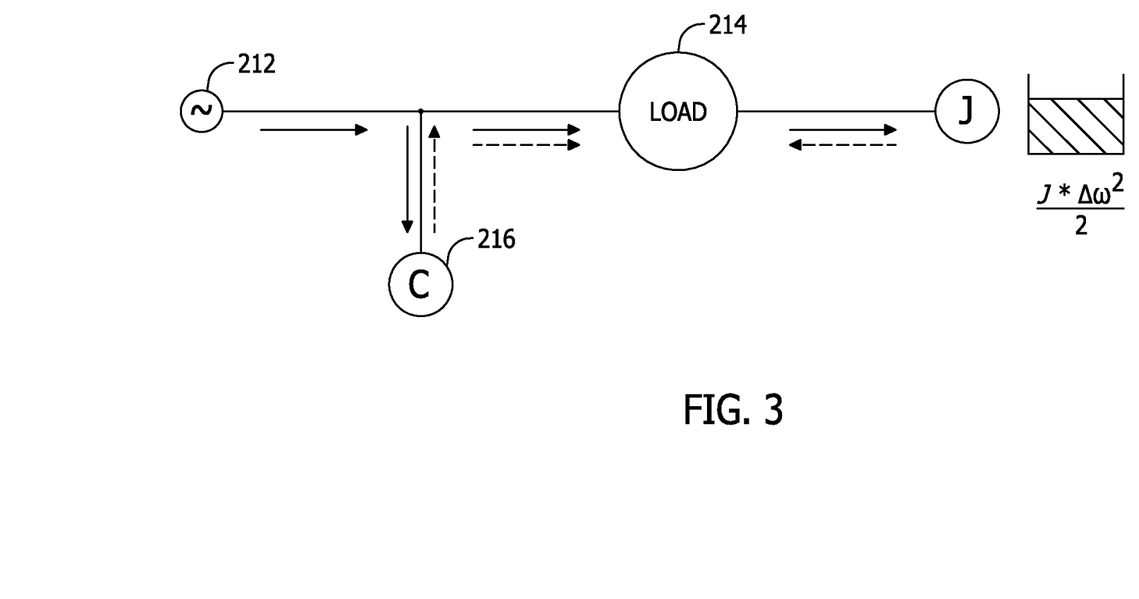
FIG. 3 is a functional diagram illustrating a direct power transfer (DPT) control method used by the motor drive circuit shown in FIG. 2.

FIG. 3 is a functional diagram illustrating a direct power transfer (DPT) control method 300 used by motor drive circuit 200 (shown in FIG. 2). Because only a small capacitor 216 is used in motor drive circuit 200, large amounts of voltage are not stored on the DC link of motor drive circuit 200. Rather, in the exemplary embodiment, motor drive circuit 200 stores energy on rotational load 214, which is coupled to a rotatable shaft (not shown) of electric motor 202. More specifically, in the exemplary embodiment, load 214 is a mechanical energy storage device (i.e., a compressor, a condenser fan, or a blower). For example, in one embodiment, load 214 may be a compressor, a condenser fan, or a blower in an HVAC system.

During operation, in the exemplary embodiment, rectifier 206 (shown in FIG. 2) rectifies the AC line input voltage received from power supply 212 into a pulsed AC. When AC line input voltage is available, control unit 208 is configured to increase energy transfer from electric motor 202 to be stored on load 214 as inertia. More specifically, when input voltage is available, the torque increases, causing the rotational speed of load 214 to also increase. Inertia stored on rotating load 214 is represented by the equation $(J*\Delta\omega^2)/2$, where J represents inertia of load 214 and $\Delta\omega$ represents a change in speed of load 214 with respect to time. In the exemplary embodiment, the inertia of load 214 limits speed variations of electric motor 202, which enables torque production to continue when input voltage is unavailable.

In one embodiment, while input voltage is available, control unit 208 also causes small amounts of voltage to be stored in capacitor 216. When the AC line input voltage approaches zero, capacitor 216 provides the stored voltage to electric motor 202. The amount of energy stored in capacitor 216 is represented by the equation $(C*\Delta U^2)/2$, where C represents a capacitance of capacitor 216 and $\Delta U$ represents a change in voltage in capacitor 216 with respect to time.

As the input voltage begins to drop, torque produced on load 214 by electric motor 202 turns into rotational speed. As AC line input voltage approaches zero or DC link voltage has approximately 100% voltage ripple, control unit 208 mitigates a reduction in energy transfer from load 214 to electric motor 202 (represented by dashed arrows) to produce positive torque. More specifically, control unit 208 controls current flowing to electric motor 202 such that electric motor 202 continues producing torque when input voltage to electric motor 202 approaches zero or equals zero. To do so, control unit 208 implements algorithms or executes instructions stored on memory device to produce a signal that induces a flux linkage component of current to maintain a torque component of the current above zero. More specifically, control unit 208 injects a negative d-axis current signal to electric motor 202 as AC line input voltage approaches zero to maintain q-axis current at a positive level. In an alternative embodiment, control unit 208 also manages energy transfer from capacitor 216 to electric motor 202 (represented by dashed arrows). These energy transfers enable electric motor 202 to operate while input voltage is low or unavailable during each phase of the pulsed DC voltage.

Figure 4:
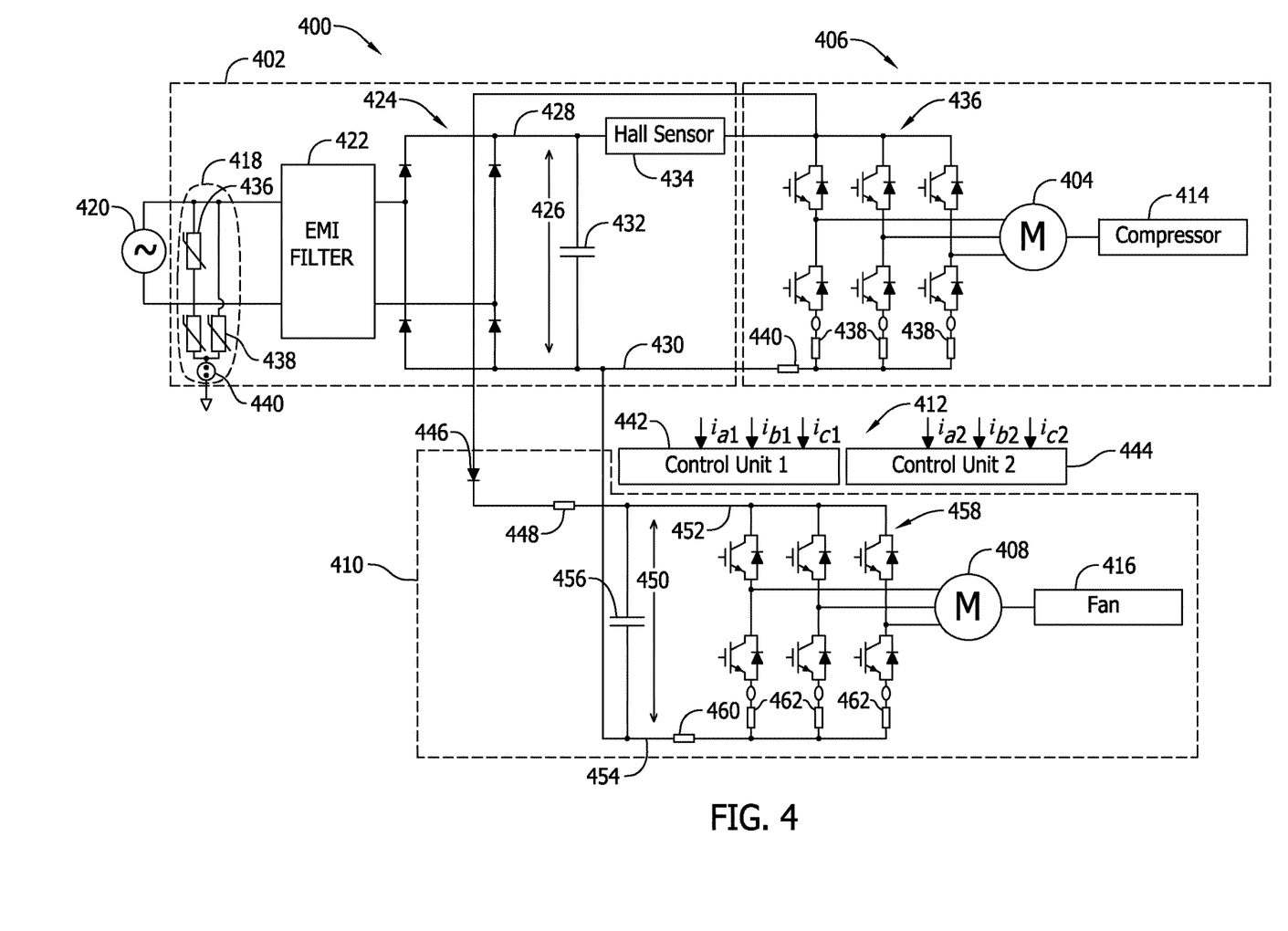
FIG. 4 is a circuit diagram of an exemplary hybrid twin motor system.

FIG. 4 is a circuit diagram of an exemplary hybrid twin motor system 400. In the exemplary embodiment, compressor motor 114 and condenser fan motor 120 (shown in FIGS. 1 and 2) operate in much the same manner, from a motor operation perspective, though the motors are different in size, scale, and end use function. More specifically, depending on the mode of operation, compressor motor 114 and condenser motor 120 may operate at different times and may use different parameters that are programmed into their respective control units 208 (shown in FIG. 2). Motor drive circuit 200 (shown in FIG. 2) includes many similar components for compressor motor 114 and condenser motor 120, and while certain of the components of motor drive circuit 200 for condenser motor 120 are likely not of a size and scale for operation of compressor motor 114, the components of motor drive circuit 200 for compressor motor 114 are of a size and scale for operation of condenser motor 120, as such motors only draw the current necessary for their operation. Accordingly, as shown in FIG. 4, hybrid twin motor system 400 includes a common motor drive circuit 402 that combines common components of the compressor and condenser motor drive circuits. More specifically, in the exemplary embodiment, hybrid twin motor system 400 includes common motor drive circuit 402, a first electric motor 404 having a first motor drive circuit 406, a second electric motor 408 having a second motor drive circuit 410 and a motor controller 412. System 400 is referred to as a hybrid system because it uses a low-capacitance capacitor (between about 0.1 µF and about 10 µF) in first motor drive circuit 406 and a high-capacitance capacitor (between about 200 µF and 1000 µF) in second motor drive circuit 410.

In the exemplary embodiment, and as described herein, first electric motor 404 is a compressor motor 404 for a compressor 414, first motor drive circuit 406 is a compressor motor drive circuit 406, second electric motor 408 is a condenser fan motor 408 for a condenser fan 416, and second motor drive circuit 410 is a condenser fan motor drive circuit 410. In the exemplary embodiment, compressor motor drive circuit 406 is loaded by compressor motor 404, which has a power capability between about 1.5 HP~7.5 HP, and condenser fan motor drive circuit 410 is loaded by a condenser fan motor 408, which has a power capability of about ⅓ HP.

In the exemplary embodiment, common motor drive circuit 402 includes a surge protection device 418 configured to be coupled to a power supply 420, an electromagnetic interference (EMI) filter 422, a rectifier 424, a first DC-link 426 defined by a positive DC-link rail 428 and a negative DC-link rail 430, a low-capacitance capacitor 432 coupled across first DC link 426, and a hall sensor 434 coupled to positive DC-link rail 428.

Surge protection device 418 includes a line-to-line metal oxide varistor (MOV) 436, a line-to-ground MOV 438, and a gas discharge tube (GDT) 440. Surge protection device 418 is configured to provide lightning protection for hybrid twin motor system 400 when there is a surge in voltage from power supply 420. In the exemplary embodiment, power supply 420 is a single phase alternating current power source, such as an electrical grid or utility, that supplies a sine wave input voltage. EMI filter 422 is configured to prevent EMI noise from coupling back to power supply 420. The signals output from EMI filter 422 are applied to rectifier 424, which transforms the sine wave input voltage to a rectified AC voltage.

Low-capacitance capacitor 432 is configured to store small amounts of energy when input voltage is available. In the exemplary embodiment, low-capacitance capacitor 432 is a film capacitor and has a capacitance between about 0.1 µF and about 10 µF. The use of bulky, unreliable electrolytic filter capacitors in common motor drive circuit 402 is avoided. Low-capacitance capacitor 432 is used as the energy storage component for compressor motor 404. Further, low-capacitance capacitor 432 facilitates increasing a power factor of hybrid twin motor system 400 to at least about 0.9.

Hall sensor 434 is coupled to positive DC-link rail 428 after low-capacitance capacitor 432 and is configured to provide ground fault protection when large current flows through positive DC-link rail 428. In the exemplary embodiment, current is considered a large current when it is larger than a normal operating current of the particular electric motor and may be higher than 100 Amps in a typical 240 V AC-line system. In one embodiment, a ground fault occurs when current supplied from a power supply goes directly to earth ground and does not return to the normal power lines due to damage of motor insulation, which creates large short circuit current and may damage semiconductor devices in the system. Hall sensor 434 senses current on positive DC-link rail 428 and outputs a fault signal to motor controller 412, and receives a reset signal from motor controller 412.

In the exemplary embodiment, compressor motor drive circuit 406 is coupled to first DC-link 426 downstream from hall sensor 434. Compressor motor drive circuit 406 includes an inverter 436 configured to be coupled to compressor motor 404. In the exemplary embodiment, inverter 436 is a three-phase DC-AC voltage source inverter. Inverter 436 is configured to receive control signals from motor controller 412 and supply compressor motor 404 with conditioned AC voltage accordingly.

In the exemplary embodiment, inverter 436 is a three-phase inverter and includes a set of inverter switches for each of the three phases. Inverter 436 also includes first, second, and third shunt resistors 438 coupled to respective sets of inverter switches and to said negative DC-link rail 430. In another embodiment, inverter 436 includes one shunt resistor 440 coupled to negative DC-link rail 430. In either case, shunt resistors 438 or shunt resistor 440 are configured to sense current on negative DC-link rail 430 to provide ground fault current protection for negative DC-link rail 430.

In the exemplary embodiment, motor controller 412 is programmed to control operation of both compressor motor 404 and condenser fan motor 408 of hybrid twin motor system 400. More specifically, motor controller 412 includes a first control unit 442 operable to perform current control and pulse-width modulated (PWM) signal generation for compressor motor 404 and a second control unit 444 operable to perform current control and pulse-width modulated signal generation for condenser fan motor 408.

First control unit 442 is configured to implement DPT control of power supplied to drive compressor 414. More specifically, first control unit 442 is configured to increase energy transfer from compressor motor 404 to compressor 414 when input voltage is available and to mitigate a reduction in energy transfer from compressor 414 to compressor motor 404 to produce positive torque when DC-link voltage has approximately 100% voltage ripple. To control compressor 414, first control unit 442 is configured to generate PWM signals that are applied to inverter 436 to control rotation of compressor motor 404. Additionally, first control unit 442 is configured to receive the fault signal from hall sensor 434 and processed shunt currents from shunt resistors 438, and in response to a ground fault, disables any PWM signals to inverter 436 to remove power to compressor motor 404 during a fault.

In the exemplary embodiment, second or condenser fan motor drive circuit 410 includes a diode 446, a negative temperature coefficient (NTC) resistor 448, a second DC-link 450 defined by a second positive DC-link rail 452 and a second negative DC-link rail 454, a high-capacitance capacitor 456 coupled across second DC link 450, an inverter 458, and one or three shunt resistors 460 or 462.

Diode 446 and NTC resistor 448 are coupled between low-capacitance capacitor 432 and high-capacitance capacitor 456. More specifically, diode 446 and NTC resistor 448 are coupled after hall sensor 434 so that hall sensor 434 may also provide ground fault protection for condenser fan motor 408. In the exemplary embodiment, diode 446 and NTC resistor 448 are configured to provide inrush current protection for condenser fan motor drive circuit 410 that may be caused by the presence of high-capacitance capacitor 456.

In the exemplary embodiment, high-capacitance capacitor 456 has a capacitance between about 200 μF and 1000 μF. High-capacitance capacitor 456 receives the rectified AC voltage generated by rectifier 424 and generate a smoothed DC voltage which is applied to inverter 458.

Inverter 458 is configured to be coupled to condenser fan motor 408. In the exemplary embodiment, inverter 458 is a three-phase DC-AC voltage source inverter. Inverter 458 is configured to receive control signals from motor controller 412 and supply condenser fan motor 408 with conditioned AC voltage accordingly.

In the exemplary embodiment, inverter 458 is a three-phase inverter and includes a set of inverter switches for each of the three phases. Inverter 458 also includes first, second, and third shunt resistors 462 coupled to respective sets of inverter switches and to negative DC-link rail 454. In another embodiment, inverter 458 includes one shunt resistor 464 coupled to negative DC-link rail 454. In either case, shunt resistors 462 or shunt resistor 464 are configured to sense current on negative DC-link rail 454 to provide ground fault current protection for negative DC-link rail 454.

In the exemplary embodiment, second control unit 444 is configured to generate PWM signals that are applied to inverter 458 to control rotation of condenser fan motor 408 using energy stored on high-capacitance capacitor 456. Additionally, second control unit 444 is configured to receive the fault signal from hall sensor 434 and processed shunt currents from shunt resistors 462, and in response to a ground fault, disables any PWM signals to inverter 458 to remove power to condenser fan motor 408 during a fault.

Figure 5:
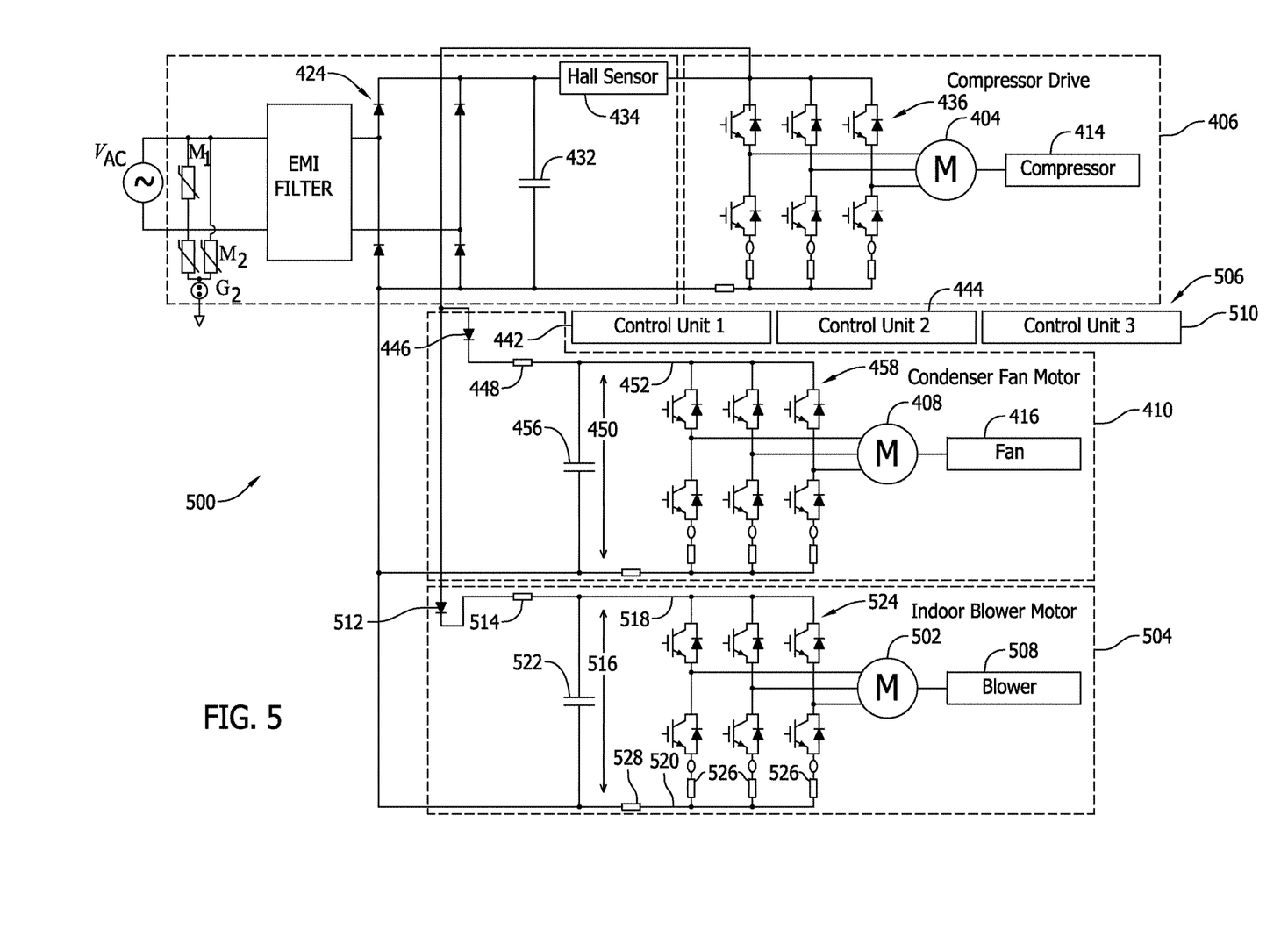
FIG. 5 is a circuit diagram of an exemplary hybrid triple motor system.

FIG. 5 is a circuit diagram of an exemplary hybrid triple motor system 500. In the exemplary embodiment, hybrid triple motor system 500 includes common motor drive circuit 402 (shown in FIG. 4) that combines common components of a compressor motor drive circuit, a condenser motor drive circuit, and a blower motor drive circuit. More specifically, in the exemplary embodiment, hybrid triple motor system 500 includes common motor drive circuit 402, first electric motor 404 having first motor drive circuit 406, second electric motor 408 having second motor drive circuit 410, a third electric motor 502 having a third motor drive circuit 504, and a motor controller 506. System 500 is referred to as a hybrid system because it uses a low-capacitance capacitor (between about 0.1 μF and about 10 μF) in first motor drive circuit 406, a high-capacitance capacitor (between about 200 μF and 1000 μF) in second motor drive circuit 410, and a high-capacitance capacitor (between about 500 μF and 1000 μF) in third motor drive circuit 504.

In the exemplary embodiment, and as described herein, first electric motor 404 is a compressor motor 404 for a compressor 414, first motor drive circuit 406 is a compressor motor drive circuit 406, second electric motor 408 is a condenser fan motor 408 for a condenser fan 416, second motor drive circuit 410 is a condenser fan motor drive circuit 410, third electric motor 502 is a blower motor 502 for a blower 508, and third motor drive circuit 504 is a blower motor drive circuit 504. Further, in the exemplary embodiment, compressor motor drive circuit 406 is loaded by compressor motor 404, which has a power capability between about 1.5 HP~7.5 HP, condenser fan motor drive circuit 410 is loaded by a condenser fan motor 408, which has a power capability of about ⅓ HP, and blower motor drive circuit 504 is loaded by blower motor 502, which has a power capability between about ⅓ HP and 1 HP.

Common motor drive circuit 402 and condenser fan motor drive circuit 410 were discussed in the description of FIG. 4 and their descriptions will not be repeated in the description of FIG. 5.

In the exemplary embodiment, motor controller 506 is programmed to control operation of compressor motor 404, condenser fan motor 408, and blower motor 502 of hybrid triple motor system 500. More specifically, motor controller 506 includes first control unit 442 (shown in FIG. 4) operable to perform current control and PWM signal generation for compressor motor 404 and a second control unit 444 (shown in FIG. 4) operable to perform current control and pulse-width modulated signal generation for condenser fan motor 408, and a third control unit 510 operable to perform current control and pulse-width modulated signal generation for blower motor 502. First control unit 442 and second control unit 444 were discussed in the description of FIG. 4 and their descriptions will not be repeated in the description of FIG. 5.

In the exemplary embodiment, hybrid triple motor system 500 further includes third or blower fan motor drive circuit 504. Blower fan motor drive circuit 504 includes a diode 512, a negative temperature coefficient (NTC) resistor 514, a third DC-link 516 defined by a third positive DC-link rail 518 and a third negative DC-link rail 520, a high-capacitance capacitor 522 coupled across third DC link 516, an inverter 524, and three shunt resistors 526 or one shunt resistor 528.

Diode 512 and NTC resistor 514 are coupled between low-capacitance capacitor 432 and high-capacitance capacitor 522. More specifically, diode 512 and NTC resistor 514 are coupled after hall sensor 434 so that hall sensor 434 may also provide ground fault protection for blower motor 502. In the exemplary embodiment, diode 512 and NTC resistor 514 are configured to provide inrush current protection for blower motor drive circuit 504 that may be caused because of the presence of high-capacitance capacitor 522.

In the exemplary embodiment, high-capacitance capacitor 522 has a capacitance between about 500 µF and 1000 µF. High-capacitance capacitor 522 receives the rectified AC voltage generated by rectifier 424 and generates a smoothed DC voltage which is applied to inverter 524.

Inverter 524 is configured to be coupled to blower motor 502. In the exemplary embodiment, inverter 524 is a three-phase DC-AC voltage source inverter. Inverter 524 is configured to receive control signals from motor controller 506 and supply blower motor 502 with conditioned AC voltage accordingly.

In the exemplary embodiment, inverter 524 is a three-phase inverter and includes a set of inverter switches for each of the three phases. Inverter 524 also includes first, second, and third shunt resistors 526 coupled to respective sets of inverter switches and to negative DC-link rail 520. In another embodiment, inverter 524 includes one shunt resistor 528 coupled to negative DC-link rail 520. In either case, shunt resistors 526 or shunt resistor 528 are configured to sense current on negative DC-link rail 520 to provide ground fault current protection for negative DC-link rail 520.

In the exemplary embodiment, third control unit 510 is configured to generate PWM signals that are applied to inverter 524 to control rotation of blower motor 502 using energy stored on high-capacitance capacitor 522. Additionally, third control unit 510 is configured to receive the fault signal from hall sensor 434 and processed shunt currents from shunt resistors 526, and in response to a ground fault, disables any PWM signals to inverter 524 to remove power to blower motor 502 during a fault.

Figure 6:
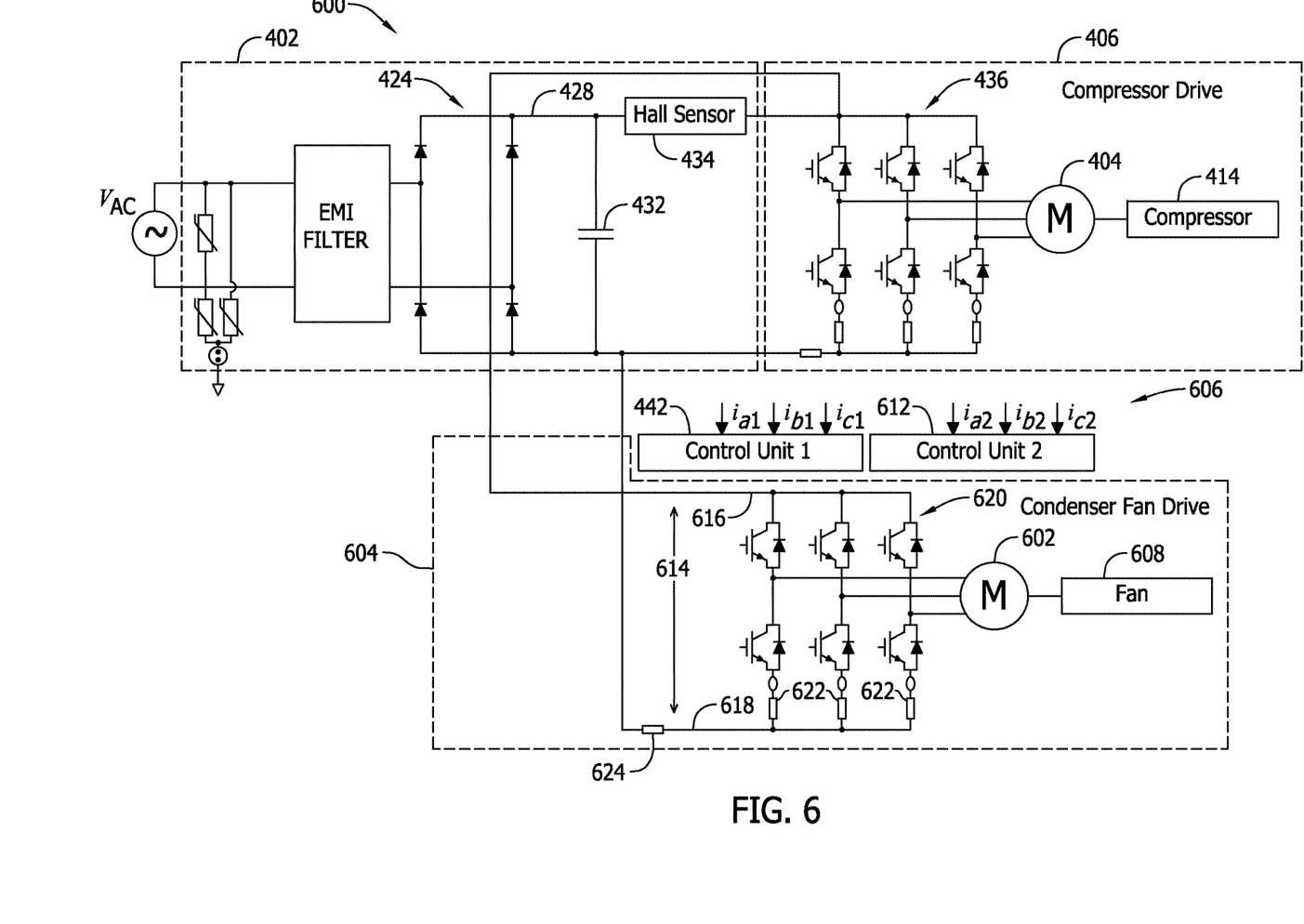
FIG. 6 is a circuit diagram of an exemplary direct power transfer (DPT) twin motor system.

FIG. 6 is a circuit diagram of an exemplary direct power transfer (DPT) twin motor system 600. In the exemplary embodiment, DPT twin motor system 600 includes a common motor drive circuit 402 that combines common components of a compressor motor drive circuit, and a condenser motor drive circuit. More specifically, in the exemplary embodiment, DPT twin motor system 600 includes common motor drive circuit 402, first electric motor 404 having first motor drive circuit 406, a second electric motor 602 having a second motor drive circuit 604, and a motor controller 606.

In the exemplary embodiment, and as described herein, first electric motor 404 is a compressor motor 404 for a compressor 414, first motor drive circuit 406 is a compressor motor drive circuit 406, second electric motor 602 is a condenser fan motor 602 for a condenser fan 608, and second motor drive circuit 604 is a condenser fan motor drive circuit 604. Further, in the exemplary embodiment, compressor motor drive circuit 406 is loaded by a compressor motor 404, which has a power capability between about 1.5 HP~7.5 HP, and condenser fan motor drive circuit 604 is loaded by a condenser fan motor 602, which has a power capability of about ⅓ HP.

Common motor drive circuit 402 was discussed in the description of FIG. 4 and its description will not be repeated in the description FIG. 6.

In the exemplary embodiment, motor controller 606 is programmed to control operation of both compressor motor 404 and condenser fan motor 602 of DPT twin motor system 600. More specifically, motor controller 606 includes first control unit 442 (shown in FIG. 4) operable to perform current control and PWM signal generation for compressor motor 404 and a second control unit 612 operable to perform current control and pulse-width modulated signal generation for condenser fan motor 602.

First control unit 442 is configured to implement DPT control of power supplied to drive compressor 414. More specifically, first control unit 442 is configured to increase energy transfer from compressor motor 404 to compressor 414 when input voltage is available and to mitigate a reduction in energy transfer from compressor 414 to compressor motor 404 to produce positive torque when DC-link voltage has approximately 100% voltage ripple. To control compressor 414, first control unit 442 is configured to generate PWM signals that are applied to inverter 436 to control rotation of compressor motor 404. Additionally, first control unit 442 is configured to receive the fault signal from hall sensor 434 and processed shunt currents from shunt resistors 438, and in response to a ground fault, disables any PWM signals to inverter 436 to remove power to compressor motor 404 during a fault.

In the exemplary embodiment, second or condenser fan motor drive circuit 604 includes a second DC-link 614 defined by a second positive DC-link rail 616 and a second negative DC-link rail 618, an inverter 620, and three shunt resistors 622 or one shunt resistor 624.

Inverter 620 is configured to be coupled downstream from hall sensor 434 via second DC-link 614. Inverter 620 receives the rectified AC voltage generated by rectifier 424. In the exemplary embodiment, inverter 620 is a three-phase DC-AC voltage source inverter. Inverter 620 is configured to receive control signals from motor controller 606 and supply condenser fan motor 408 with conditioned AC voltage accordingly.

In one embodiment, inverter 620 includes three shunt resistors 622, one coupled to each phase of three-phase inverter 620. In another embodiment, inverter 620 includes one shunt resistor 624 coupled to second negative DC-link rail 618. In either case, shunt resistors 622 or shunt resistor 624 are configured to sense current on second negative DC-link rail 618 to provide ground fault current protection for second negative DC-link rail 618.

In the exemplary embodiment, inverter 620 is a three-phase inverter and includes a set of inverter switches for each of the three phases. Inverter 620 also includes first, second, and third shunt resistors 622 coupled to respective sets of inverter switches and to negative DC-link rail 618. In another embodiment, inverter 620 includes one shunt resistor 624 coupled to negative DC-link rail 618. In either case, shunt resistors 622 or shunt resistor 624 are configured to sense current on negative DC-link rail 618 to provide ground fault current protection for negative DC-link rail 618.

In the exemplary embodiment, second control unit 612 is configured to implement DPT control of power supplied to drive condenser fan motor 602. More specifically, second control unit 612 is configured to increase energy transfer from condenser fan motor 602 to condenser fan 608 when input voltage is available and to mitigate a reduction in energy transfer from condenser fan 608 to condenser fan motor 602 to produce positive torque when second DC-link voltage has approximately 100% voltage ripple. To control condenser fan 608, second control unit 612 is configured to generate PWM signals that are applied to inverter 620 to control rotation of condenser fan motor 408. Additionally, second control unit 612 is configured to receive the fault signal from hall sensor 434 and processed shunt currents from shunt resistors 622, and in response to a ground fault, disables any PWM signals to inverter 620 to remove power to condenser fan motor 602 during a fault.

Figure 7:
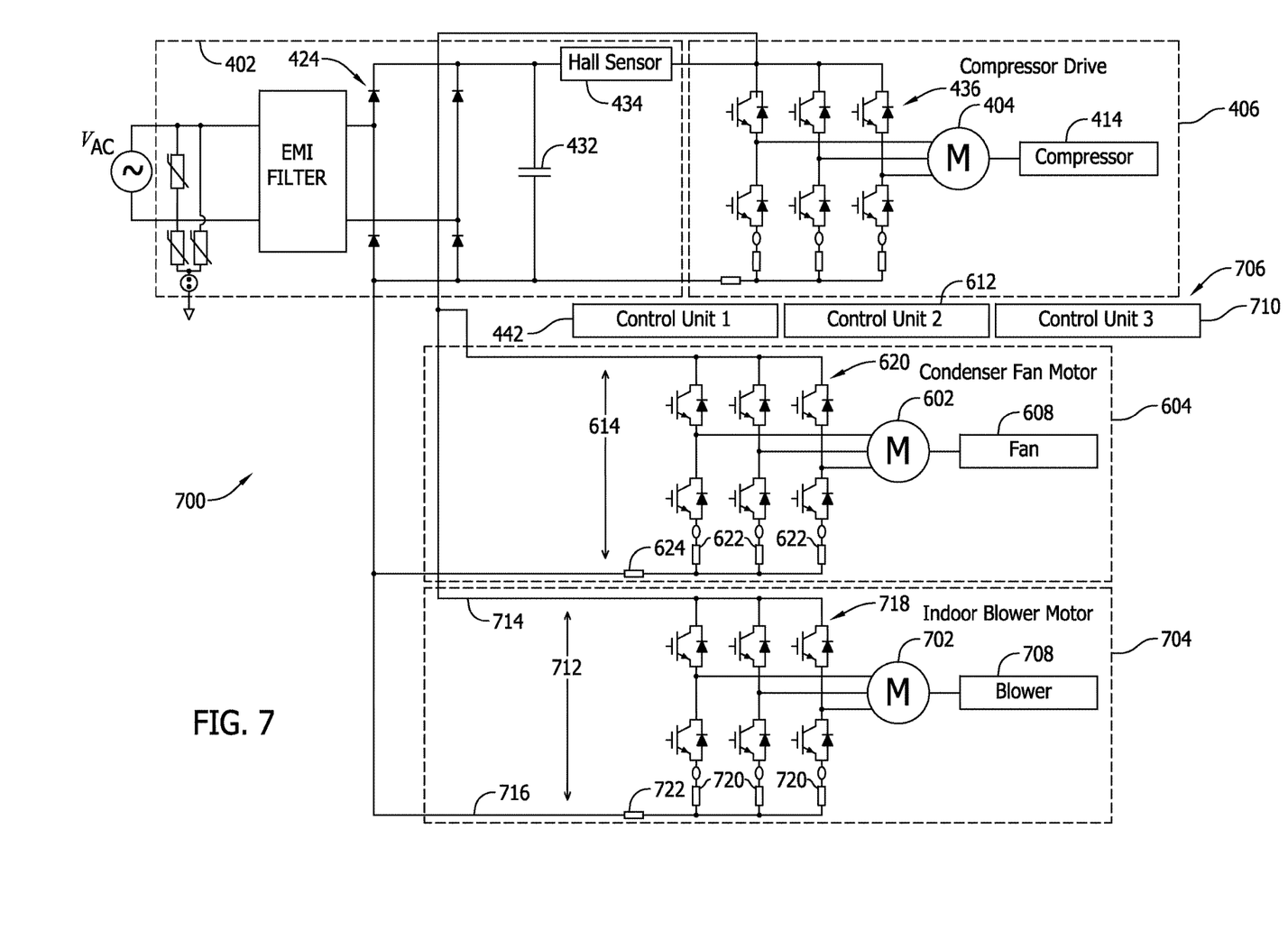
FIG. 7 is a circuit diagram of an exemplary direct power transfer (DPT) triple motor system.

FIG. 7 is a circuit diagram of an exemplary direct power transfer (DPT) triple motor system 700. In the exemplary embodiment, DPT triple motor system 700 includes a common motor drive circuit 402 that combines common components of a compressor motor drive circuit, and a condenser motor drive circuit. More specifically, in the exemplary embodiment, DPT triple motor system 700 includes common motor drive circuit 402 (shown in FIG. 4), first electric motor 404 (shown in FIG. 4) having first motor drive circuit 406 (shown in FIG. 4), second electric motor 602 (shown in FIG. 6) having second motor drive circuit 604 (shown in FIG. 6), a third electric motor 702 having a third motor drive circuit 704, and a motor controller 706.

In the exemplary embodiment, and as described herein, first electric motor 404 is a compressor motor 404 for a compressor 414, first motor drive circuit 406 is a compressor motor drive circuit 406, second electric motor 602 is a condenser fan motor 602 for a condenser fan 608, second motor drive circuit 604 is a condenser fan motor drive circuit 604, third electric motor 702 is a blower motor 702 for a blower 708, and third motor drive circuit 704 is a blower motor drive circuit 704. Further, in the exemplary embodiment, compressor motor drive circuit 406 is loaded by a compressor motor 404, which has a power capability between about 1.5 HP~7.5 HP, condenser fan motor drive circuit 604 is loaded by condenser fan motor 602, which has a power capability of about ⅓ HP, and blower motor drive circuit 704 is loaded by blower motor 702, which has a power capability between about ⅓ HP and 1 HP.

Common motor drive circuit 402 and condenser fan motor drive circuit 604 were discussed in the descriptions of FIG. 4 and FIG. 6, respectively, and their descriptions will not be repeated in the description of FIG. 7.

In the exemplary embodiment, motor controller 706 is programmed to control operation of compressor motor 404, condenser fan motor 602, and blower motor 702 of DPT triple motor system 700. More specifically, motor controller 706 includes first control unit 442 (shown in FIG. 4) operable to perform current control and PWM signal generation for compressor motor 404 and second control unit 612 (shown in FIG. 6) operable to perform current control and PWM signal generation for condenser fan motor 602, and a third control unit 710 operable to perform current control and PWM signal generation for blower motor 702.

First control unit 442 is configured to implement DPT control of power supplied to drive compressor 414. More specifically, first control unit 442 is configured to increase energy transfer from compressor motor 404 to compressor 414 when input voltage is available and to mitigate a reduction in energy transfer from compressor 414 to compressor motor 404 to produce positive torque when DC-link voltage has approximately 100% voltage ripple. To control compressor 414, first control unit 442 is configured to generate PWM signals that are applied to inverter 436 to control rotation of compressor motor 404. Additionally, first control unit 442 is configured to receive the fault signal from hall sensor 434 and processed shunt currents from shunt resistors 438, and in response to a ground fault, disables any PWM signals to inverter 436 to remove power to compressor motor 404 during a fault.

In the exemplary embodiment, second control unit 612 is configured to implement DPT control of power supplied to drive condenser fan motor 602. More specifically, second control unit 612 is configured to increase energy transfer from condenser fan motor 602 to condenser fan 608 when input voltage is available and to mitigate a reduction in energy transfer from condenser fan 608 to condenser fan motor 602 to produce positive torque when second DC-link voltage has approximately 100% voltage ripple. To control condenser fan 608, second control unit 612 is configured to generate PWM signals that are applied to inverter 620 to control rotation of condenser fan motor 602. Additionally, second control unit 612 is configured to receive the fault signal from hall sensor 434 and processed shunt currents from shunt resistors 622, and in response to a ground fault, disables any PWM signals to inverter 620 to remove power to condenser fan motor 408 during a fault.

In the exemplary embodiment, third or blower fan motor drive circuit 704 includes a third DC-link 712 defined by a third positive DC-link rail 714 and a third negative DC-link rail 716, an inverter 718, and three shunt resistors 720 or one shunt resistor 722.

Inverter 718 is configured to be coupled downstream from hall sensor 434 via third DC-link 712. Inverter 718 receives the rectified AC voltage generated by rectifier 424. In the exemplary embodiment, inverter 718 is a three-phase DC-AC voltage source inverter. Inverter 718 is configured to receive control signals from motor controller 706 and supply blower motor 702 with conditioned AC voltage accordingly.

In one embodiment, inverter 718 includes three shunt resistors 720, one coupled to each phase of three-phase inverter 718. In another embodiment, inverter 718 includes one shunt resistor 722 coupled to third negative DC-link rail 716. In either case, shunt resistors 720 or shunt resistor 722 are configured to sense current on third negative DC-link rail 716 to provide ground fault current protection for negative DC-link rail 716.

In the exemplary embodiment, inverter 718 is a three-phase inverter and includes a set of inverter switches for each of the three phases. Inverter 718 also includes first, second, and third shunt resistors 720 coupled to respective sets of inverter switches and to negative DC-link rail 716. In another embodiment, inverter 718 includes one shunt resistor 722 coupled to negative DC-link rail 716. In either case, shunt resistors 720 or shunt resistor 722 are configured to sense current on negative DC-link rail 716 to provide ground fault current protection for negative DC-link rail 716.

In the exemplary embodiment, third control unit 710 is configured to implement DPT control of power supplied to drive blower motor 702. More specifically, third control unit 710 is configured to increase energy transfer from blower motor 702 to blower 708 when input voltage is available and to mitigate a reduction in energy transfer from blower 708 to blower motor 702 to produce positive torque when third DC-link voltage has approximately 100% voltage ripple. To control blower 708, third control unit 710 is configured to generate PWM signals that are applied to inverter 718 to control rotation of blower motor 702. Additionally, third control unit 710 is configured to receive the fault signal from hall sensor 434 and processed shunt currents from shunt resistors 720, and in response to a ground fault, disables any PWM signals to inverter 718 to remove power to blower motor 702 during a fault.

Figure 8:
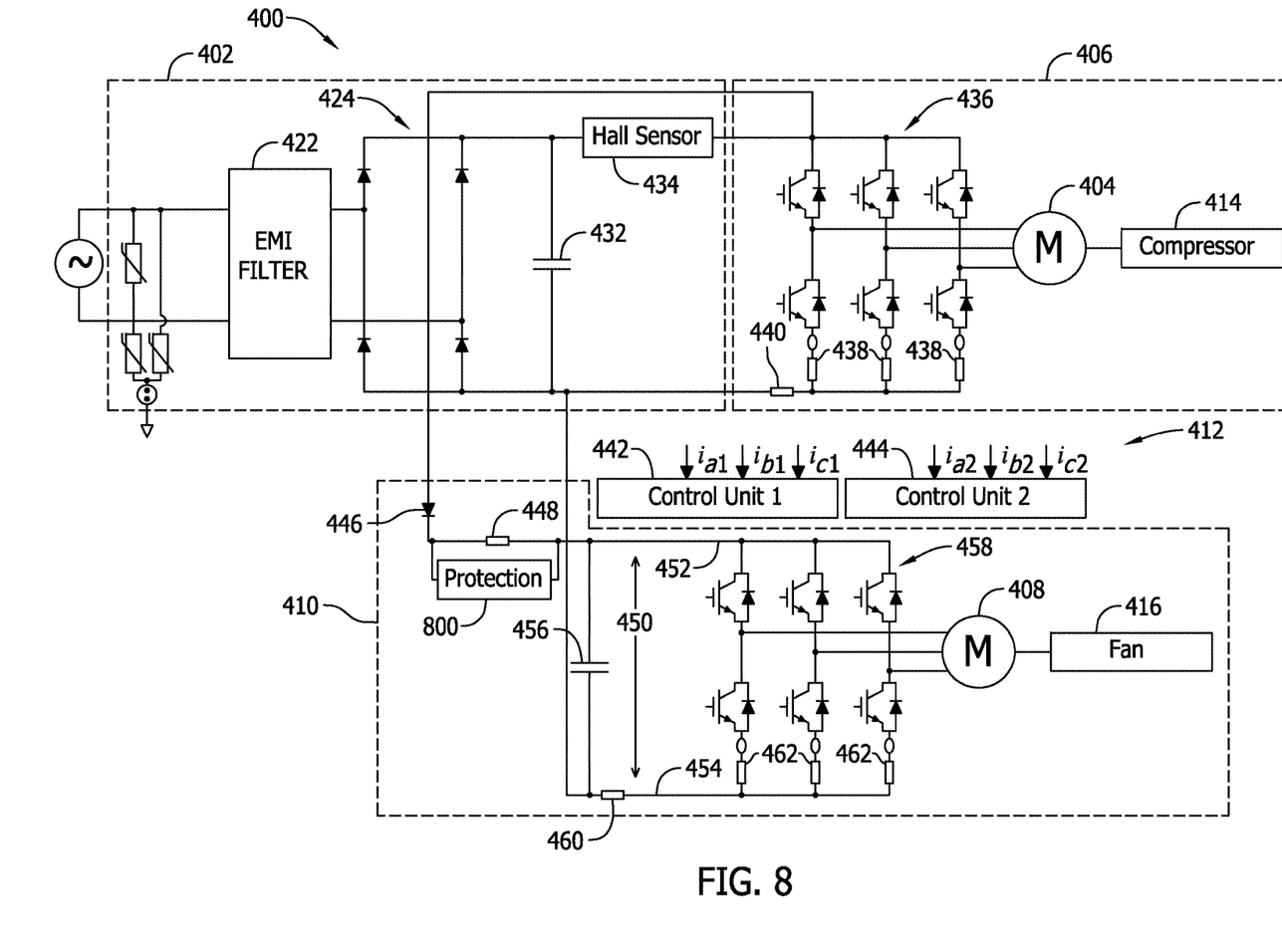
FIG. 8 is a circuit diagram of the hybrid twin motor system shown in FIG. 4 including a surge protection circuit.
Figure 9:
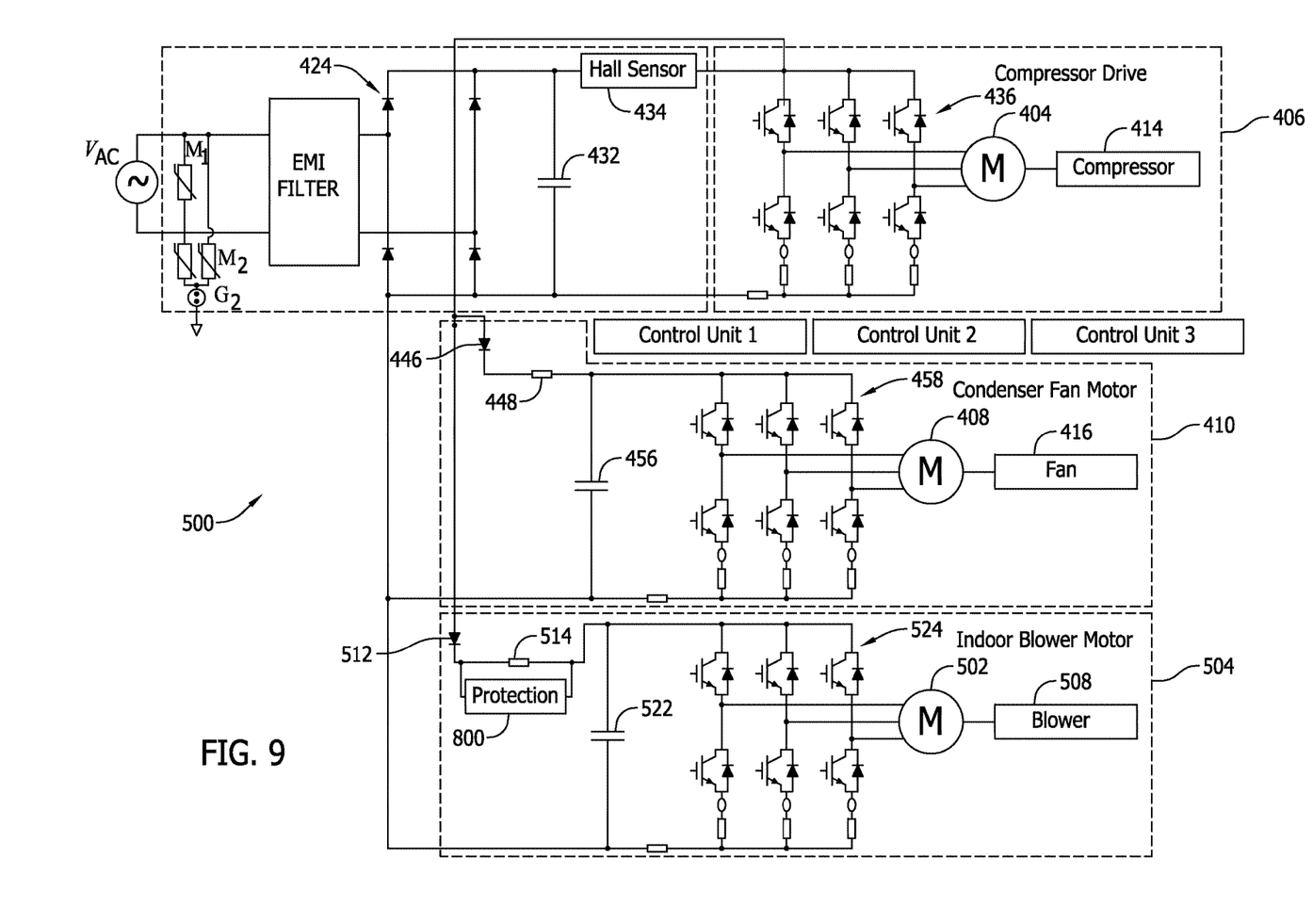
FIG. 9 is a circuit diagram of the hybrid triple motor system shown in FIG. 5 including the surge protection circuit shown in FIG. 8.

FIG. 8 is a circuit diagram of hybrid twin motor system 400 (shown in FIG. 4) including a surge protection circuit 800. FIG. 9 is a circuit diagram of hybrid triple motor system 500 (shown in FIG. 5) including surge protection circuit 800. In HVAC applications, motor systems should meet surge protection requirements (i.e., 6,000 volts lightning surge) and ensure that an overshoot voltage in DC-link is lower than a voltage rating of semiconductor devices in the inverter stages. This applies to hybrid motor systems 400 and 500, which include high-capacitance capacitors in the DC-link. Accordingly, surge protection circuit 800 is provided to provide such lightning surge protection.

In the exemplary embodiment, surge protection circuit 800 is coupled in parallel to a NTC resistor of a DC-link having the highest capacitance. Accordingly, in hybrid twin motor system 400 of FIG. 8, surge protection circuit 800 is coupled in parallel to NTC resistor 448 (shown in FIG. 4) of condenser fan motor drive circuit 410. Moreover, in hybrid triple motor system 500 of FIG. 9, surge protection circuit 800 is coupled in parallel to NTC resistor 514 of blower motor drive circuit 504.

Figure 10:
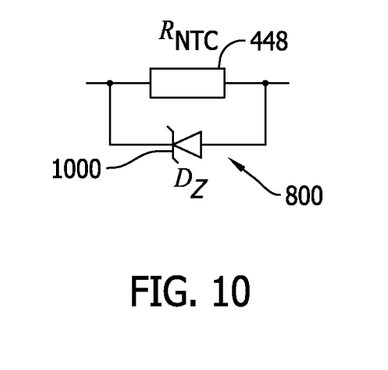
FIG. 10 is a circuit diagram of an exemplary surge protection circuit.

FIG. 10 is a circuit diagram of an exemplary surge protection circuit 800 that may be used in hybrid twin motor system 400 (shown in FIG. 8) or hybrid triple motor system 500 (shown in FIG. 9). Besides positioning, surge protection circuit 800 is the same for both hybrid twin motor system 400 and hybrid triple motor system 500, and will only be described with reference to FIG. 8.

In the exemplary embodiment, surge protection circuit 800 includes a Zener diode 1000 coupled in parallel with NTC resistor 448 (shown in FIGS. 4 and 8). When a surge voltage occurs, a voltage drop across low-capacitance capacitor 432 (shown in FIGS. 4 and 8) increases and creates a large voltage difference between first DC-link 426 and second DC-link 450. Once voltage across NTC resistor 448 exceeds a breakdown voltage of Zener diode 1000, Zener diode 1000 begins to conduct and clamps the voltage across NTC resistor 448 to a predetermined level. High-capacitance capacitor 456 absorbs the surge energy to prevent overshoot voltage in first DC-link 426 and second DC-link 450.

Figure 11:
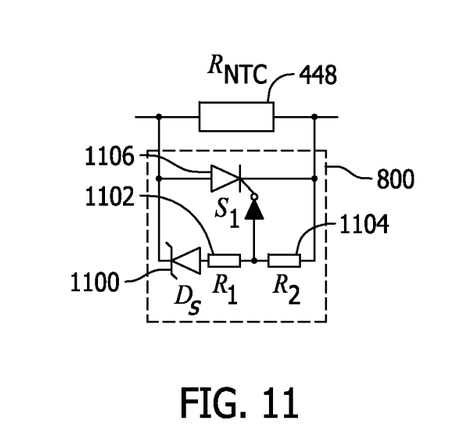
FIG. 11 is a circuit diagram of an exemplary surge protection circuit.

FIG. 11 is a circuit diagram of an exemplary surge protection circuit 800 that may be used in hybrid twin motor system 400 (shown in FIG. 8) or hybrid triple motor system 500 (shown in FIG. 9). Besides positioning, surge protection circuit 800 is the same for both hybrid twin motor system 400 and hybrid triple motor system 500, and will only be described with reference to FIG. 8.

In the exemplary embodiment, surge protection circuit 800 includes a series-coupled transient voltage suppression (TVS) diode 1100, a first resistor 1102, and a second resistor 1104, which are coupled in parallel with a silicon controlled rectifier (SCR) 1106 and NTC resistor 448. TVS diode 1100 senses a high-voltage drop or overshoot voltage across NTC resistor 448. When TVS diode 1100 breaks down, it conducts current to a gate terminal of SCR 1106, which then turns on to form a low impedance line. First resistor 1102 and second resistor 1104 limit current through TVS diode 1100. As a result, high-capacitance capacitor 456 absorbs the surge energy so that the overshoot voltage across low-capacitance capacitor 432 does not exceed the protection limit (e.g., 600 VDC). Typically, this protection voltage level is used to protect semiconductor devices that are rated at 600 VDC.

The motor drive circuits and motor controllers described herein may embody a number of different configurations and locations and remain within the purview of this disclosure. In one embodiment, the motor controller is a part of the motor drive circuit. In another embodiment, the controller might be in communication with the motor drive circuit, but be part of an electric motor. In yet another embodiment, the controller might be a part of the circuitry of the controller located in the structure. In yet another embodiment, the controller 155 might be separate from the circuitry, motor, and controller, and either be located elsewhere in the outdoor unit or even distally therefrom. In such instances, the controller may be coupled to the motor, the controller, or the circuitry either by wires, a wireless system (either of which are shown generally by the dashed line) or an optical system, in which case, the motor, the controller, or the circuitry will both include sufficiently configured conventional transmitters/receivers for wireless or optical communication.

The described embodiments provide a cost savings to the manufacturer and ultimately to the consumer as electrolytic capacitors are eliminated from a motor controller of an electric motor. Additionally, reliability of such systems increases as there are fewer components within the system. Moreover, the described embodiments reduce total harmonic distortion and increase the power factor of the electric motor in which they are installed.

A technical effect of the methods and systems described herein may include one or more of: (a) increasing, by a motor controller, energy transfer from the first electric motor to the first load when input voltage is available; (b) mitigating, by the motor controller, a reduction in energy transfer from the first load to the first electric motor to produce positive torque when a direct current (DC) link voltage is one of approaching zero and equal to zero; and (c) generating, by the motor controller, a control signal for application to the second electric motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor drive circuit configured to drive a first electric motor and a second electric motor, said electric motor drive circuit comprising:
   a rectifier configured to convert an AC input voltage to a pulsed DC voltage;
   a first DC link electrically coupled to said rectifier, said first DC-link comprising a low-capacitance capacitor having a capacitance less than 10 μF;
   a first inverter coupled to said first DC-link, said first inverter configured to generate a conditioned output voltage to drive the first electric motor, wherein the first electric motor has a power output between 1.5 horsepower (HP) and 7.5 HP;
   a second DC-link electrically coupled to said first DC-link, said second DC-link comprising a high-capacitance capacitor having a capacitance between 200 μF and 1000 μF; and
   a second inverter coupled to said second DC-link, said second inverter configured to generate a conditioned output voltage to drive the second electric motor, wherein the second electric motor has a power output between 1/3 HP and 1 HP.

2. The electric motor drive circuit of claim 1, wherein said first DC link comprises a positive DC-link rail and a negative DC-link rail, said electric motor drive circuit further comprises a hall sensor coupled to said positive DC-link rail downstream from said low-capacitance capacitor.

3. The electric motor drive circuit of claim 2, wherein said hall sensor is configured to provide ground fault protection when large current flows through said positive DC-link rail.

4. The electric motor drive circuit of claim 2, wherein said second DC-link is electrically coupled downstream from said hall sensor.

5. The electric motor drive circuit of claim 1, wherein said low-capacitance capacitor increases a power factor of the electric motor drive circuit to at least about 0.9.

6. The electric motor drive circuit of claim 1, wherein said first inverter is a three-phase inverter and comprises a set of inverter switches for each phase, said electric motor drive circuit further comprises first, second, and third shunt resistors coupled to respective sets of inverter switches and to said negative DC-link rail.

7. The electric motor drive circuit of claim 6, wherein said first, second, and third shunt resistors are configured to sense current on said negative DC-link rail to provide ground fault current protection for said negative DC-link rail.

8. The electric motor drive circuit of claim 1, further comprising a shunt resistor coupled to said negative DC-link rail and configured to sense current on said negative DC-link rail to provide ground fault current protection for said negative DC-link rail.

9. The electric motor drive circuit of claim 1, further comprising a diode and a negative temperature coefficient (NTC) resistor coupled in series between said low-capacitance capacitor and said high-capacitance capacitor.

10. The electric motor drive circuit of claim 9, wherein said diode and said NTC resistor are configured to provide inrush current protection for said second inverter caused by the presence of said high-capacitance capacitor.

11. The electric motor drive circuit of claim 9, further comprising a surge protection circuit coupled in parallel to said NTC resistor, said surge protection circuit configured to provide surge voltage protection for said first and second DC-links.

12. The electric motor drive circuit of claim 11, wherein said surge protection circuit comprises a Zener diode.

13. The electric motor drive circuit of claim 11, wherein said surge protection circuit comprises:
    a series-coupled transient voltage suppression (TVS) diode, a first resistor, and a second resistor, coupled in parallel with said NTC resistor; and
    a silicon controlled rectifier (SCR) coupled in parallel with said series-coupled TVS diode, first resistor, and second resistor, and said NTC resistor.

14. The electric motor drive circuit of claim 1, further comprising:
    a third DC-link electrically coupled to said first DC-link; and
    a third inverter coupled to said third DC-link, said third inverter configured to generate a conditioned output voltage to drive a third electric motor.

* * * * *